United States Patent [19]
Fidi

[11] 4,054,758
[45] Oct. 18, 1977

[54] MOUNTING OF PICKUP STYLUS

[75] Inventor: Werner Fidi, Baden, Austria

[73] Assignee: AKG Akustische u. Kino-Gerate Gesellschaft m.b.H., Austria

[21] Appl. No.: 737,337

[22] Filed: Nov. 1, 1976

Related U.S. Application Data

[63] Continuation-in-part of Ser. No. 587,291, June 16, 1975, abandoned.

[30] Foreign Application Priority Data

June 20, 1974 Austria ................................ 5137/74

[51] Int. Cl.[2] ........................ G11B 3/02; H04R 9/16; H04R 11/12

[52] U.S. Cl. ................. 179/100.41 K; 179/100.41 M; 179/100.41 Z; 274/37

[58] Field of Search ................. 274/37; 179/100.41 P, 179/100.41 K, 100.41 D, 100.41 M, 100.41 Z

[56] References Cited

U.S. PATENT DOCUMENTS

| | | | |
|---|---|---|---|
| 2,483,196 | 9/1949 | Gordon | 274/37 |
| 3,040,136 | 6/1962 | Grado | 179/100.41 K |
| 3,538,266 | 11/1970 | Cho | 179/100.41 K |
| 3,641,284 | 2/1972 | Westerkamp et al. | 274/37 |

OTHER PUBLICATIONS

*A New Suspension System for Phono Styli*, Fidi, Audio, 3/76, pp. 24, 27, 28.

*Primary Examiner*—Steven L. Stephan
*Attorney, Agent, or Firm*—McGlew and Tuttle

[57] ABSTRACT

A sound pickup, for tracking mechanically modulated grooves in a record support by means of a tracing stylus, includes a stylus holder elastically mounted, at its center of motion, in a bearing element of rubber or rubber-like material. A small metal plate is embedded in the bearing element to extend perpendicularly to the longitudinal axis of the stylus holder, and has a central opening therein. The stylus holder passes through the central opening and the diameter of the central opening is slightly larger than the external diameter of the stylus holder in the zone of its passage through the central opening. The thickness of the plate is small relative to such external diameter of the stylus holder, and the stylus holder is connected to the plate only through the bearing element. The bearing element is preferably a body of revolution extending to either one or both sides of the plate, with the plate being situated in the plane of the largest diameter of the bearing element, and the bearing element has a passage extending therethrough coaxial with the central opening in the plate and with the diameter less than that of the central opening in the plate.

11 Claims, 9 Drawing Figures

MOUNTING OF PICKUP STYLUS

CROSS-REFERENCE TO RELATED APPLICATION

This application is a continuation-in-part of copending application Ser. No. 587,291, filed June 16, 1975, for "MOUNTING OF PICKUP STYLUS" and now abandoned.

FIELD AND BACKGROUND OF THE INVENTION

This invention relates to sound pickups for tracking mechanically modulated grooves in a record support by means of a tracing stylus, of the type in which a stylus holder is elastically mounted, at its center of motion, in an elastic bearing element such as a bearing element of rubber and rubber-like material. More particularly, the present invention is directed to an improved pickup mounting of this type.

In modern pickups of this kind, the grooves are tracked by means of a diamond which is ground to a spherical, elliptic or other spiral shape. Such a diamond is provided at one end of a stylus holder. Ordinarily, the stylus holder is mounted in the pickup in elastic material, such as rubber, having quite specific properties, either near the theoretical center of motion or at the theoretical center of motion itself.

The position of the theoretical center of motion is determined by the geometry of the arrangement. If, for example, the stylus holder is provided in the form of a homogeneous rod or tube of the length L, the optimum position of the theoretical center of motion will be found at a distance of L/6 from the center of mass of the stylus, and in that portion of the stylus holder extending in the interior of the pickup housing. For the theoretical center of motion determined in this manner, the mass to be moved relative to the stylus tip, which is represented by the diamond, is minimized. Therefore, it is important to locate the bearing element for the stylus holder which is made, preferably, of rubber, as close as possible to the theoretical center of motion, particularly if the bearing element is relatively large, because then, due to the just-mentioned measure, the necessarily co-vibrating masses cannot have a too great reactive effect on the stylus tip.

In known pickups, in order to define the spring element more exactly, a thin, elastic wire is frequently provided at the center of motion, and this wire, on the one hand, is engaged in the bearing element and, on the other hand, is connected to a fixed point of the system. This measure proves advantageous because the rubber or rubber-like material forming the bearing element for the stylus holder must have a very high internal friction while its Shore hardness has to be small and, mostly, without the spring wire, shows a so-called tendency to creeping. The disadvantages of this arrangement are that, due to the use of the wire, resonances occur in the high and highest frequency range and that, due to the geometry of the bearing element and its connection to the casing, compression and tension forces appear which are effective at locations relatively remote from the center of motion and, because of the well-known structure of the mechanical system, are always somewhat unbalanced relative to the center of motion. Such lack of equilibrium causes an uneven frequency response of the pickup while, in addition, the relatively large mass of rubber or rubber-like material increases the total mass of the oscillating system and clips the frequency response in the upward direction.

SUMMARY OF THE INVENTION

The present invention is directed to an improved mounting, in a sound pickup, of the stylus holder which largely avoids the drawbacks of the pickup of the prior art. In accordance with the invention, this is substantially obtained by the provision that the stylus holder is passed through a central opening of a small plate extending perpendicularly to the axis of the stylus holder, that the diameter of the opening is slightly larger than the diameter of the stylus holder in this zone, that the wall thickness of the plate is small as compared to the diameter of the stylus holder, and that the stylus holder is connected to the plate only through the bearing element.

According to a further feature of the invention, the bearing element, which is preferably made of rubber, is designed as a body of revolution extending on one or both sides of the plate, the plate being situated in the plane of the largest diameter of the bearing element.

The bodies of revolution may be designed not only as double cones or double frustums having a common base extending in the plane of the plate, but also as a cylinder or sphere with the plate extending in the bisecting plane thereof, or also otherwise shaped bodies of revolution.

Further, in accordance with the invention, in cases where the co-vibrating portion of the elastic bearing element are intended, in addition, for balancing the entire dynamic system comprising the stylus, stylus holder, and rubber body, the bearing element, which may again be designed as a body of revolution, is provided on only one side of the plate, on that side facing the diamond tip, and the plate extends in the base plane of the body of revolution.

Another feature of the invention is that the opening in the bearing element, serving to receive the stylus holder itself, or a ferromagnetic part of the stylus holder has a slightly smaller diameter than the stylus holder itself, or, respectively, such ferromagnetic part, in the zone of the bearing element. Consequently, the stylus holder and the plate are connected to each other only through the bearing element of rubber. The connections between the rubber and the plate and between the rubber and the stylus holder may be established by vulcanizing or gluing. It may also be advantageous to vulcanize the rubber body only to the plate, then to plug the stylus holder into the opening having a slightly smaller diameter and, if of value, to glue the holder therein.

Various advantages result from the inventive arrangement or design. Thus, for example, the elastic forces acting on the stylus holder are greatest in the vicinity of the bearing center which is situated directly in the opening of the plate. The forces decrease with the distance from the center of motion since, in the immediately adjacent area within the opening of the plate, not least because of the firm connection between the rubber and the plate, the rubber has the smallest possibility of yielding, and therefore produces strong restoring forces. As mentioned, this takes place in the close vicinity of the center of motion so that, in the inventive mounting of the stylus holder, any dissymetries are much less weighty than in conventional pickups.

The forces for balancing the tracking force, which are to be produced closest to the center of motion, must be very strong, i.e., rubber or rubber-like materials of higher hardness might be used. In spite of that, in the inventive arrangement, a sufficiently high resilience can be obtained.

It is further known that the mounting of the stylus holders for tracking mechanically modulated grooves is to be designed largely so that the mobility in the plane of modulated motion remains as independent of the direction as possible. In all other directions, the mounting of the stylus holder is to be as rigid as possible, i.e., torsional and tensile forces acting on the stylus holder must not move it at all, if possible.

In this respect again, the inventive mounting is superior to the prior art. Should torsional forces act on the stylus holder, a motion is hardly possible, due to the proximity of the supporting surface of the plate and to the rigid connection of the stylus holder to the rubber body.

To improve the sensitivity of the pickup system, the already mentioned plate, constituting a part of the inventive mounting of a stylus holder in a pickup unit, may be made of a ferromagnetic material. In such a case, the magnetic flux passes through the plate directly to the iron casing, or ferromagnetic part, of the stylus holder, whereby, the magnetic resistance of the entire circuit is reduced, or the magnetic flux is increased.

An object of the invention is to provide an improved pickup mounting for a sound pickup for tracking mechanically modulated grooves in a record support by means of a tracking stylus.

Another object of the invention is to provide such an improved pickup mounting which is largely free of the disadvantages of prior pickup mountings of the same type.

A further object of the invention is to provide such an improved pickup mounting having increased resistance to torsional forces acting on the stylus holder.

For an understanding of the principles of the invention, reference is made to the following description of typical embodiments thereof as illustrated in the accompanying drawings.

DESCRIPTION OF THE PREFERRED EMBODIMENTS

Figure 1:
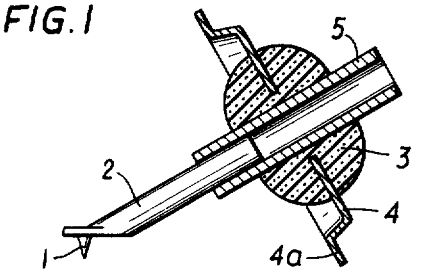
FIG. 1 is an elevation view, partly in section, of one embodiment of the improved pickup mounting of the invention.

In the pickup mounting shown in FIG. 1, a diamond 1 is shown engaging or tracking a mechanically modulated groove of a sound-track support, for example, a phonographic disc. The diamond is secured to one end of an aluminum tube 2 which is provided, at this end, with an oblique face carrying the diamond. Over the other end of aluminum tube 2, a tube 5 made of ferromagnetic material is fixedly engaged. The bearing element proper is formed by an elastic body 3 designed of rubber or rubber-like material, preferably, as a body of revolution, in which a plate 4 is embedded dividing the body into two halves. As further shown in FIG. 1, plate 4 is formed with a central opening through which ferromagnetic tube 5 of the stylus holder extends without contacting plate 4, since the diameter of the central opening of plate 4 is slightly larger than the external diameter of ferromagnetic tube 5.

It will be clear from FIG. 1 that the stylus holder is connected to plate 4 only through rubber body 3 forming the bearing element. Plate 4 may be embedded in body 3 by vulcanization or cementing. The stylus holder may also be vulcanized to body 3 along with plate 4, or it may be plugged subsequently into an opening of rubber body 3 intended for receiving the stylus holder. If necessary, the stylus holder may also be glued or cemented into the opening of body 3, the diameter of which should be slightly smaller than the diameter of the perspective portion of the stylus holder engaged therein.

Plate 4 may be completely flat. However, it is preferable, in view of the mounting in a pickup casing, to cup the plate along its rim 4*a*, as shown in FIG. 1, so as to give it a dish-shape.

Figure 2:
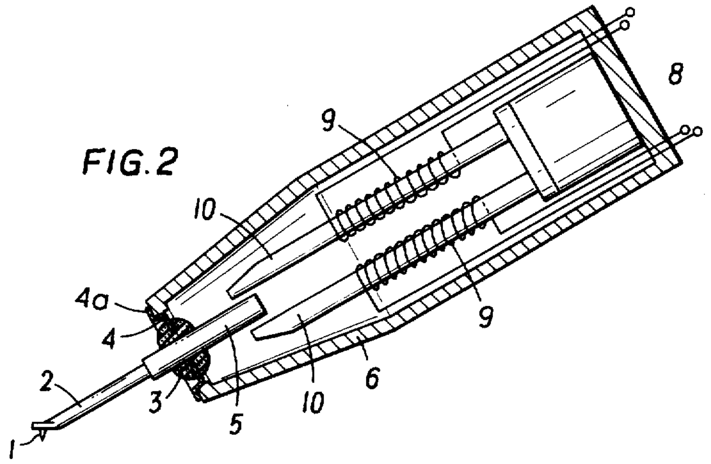
FIG. 2 is a view, similar to FIG. 1, showing the pickup mounting of FIG. 1 in combination with a sound pickup system.

FIG. 2 shows the design, in principle, of the pickup, equipped with a stylus holder, as shown in FIG. 1, mounted in accordance with the invention. The pickup comprises a casing 6 tapering in the direction of the stylus and a permanent magnet 8 with four rods 10 projecting from its front surface in square arrangement. Each rod 10 carries a winding 9 in which the flux variations of the magnetic circuit are converted into voltage variations. The magnetic flux passes through casing 6 and the ferromagnetic part 5 of the stylus holder back to rods 10 and permanent magnet 8. As already mentioned, the flux can be amplified and, thereby, the sensitivity improved if, in accordance with the invention, the plate 4 is made of a ferromagnetic material. That is, in such a case, the gap between the end of casing 6 and ferromagnetic part 5 of the stylus holder is minimized so that a flux amplification is obtained and also the flux variations produced by the motion of the stylus holder result in higher induced voltages in windings 9.

Figure 3:
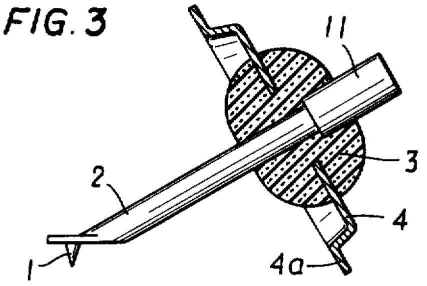
FIG. 3 is an elevation view, partly in section, of another embodiment of the improved pickup mounting of the invention.
Figure 4:
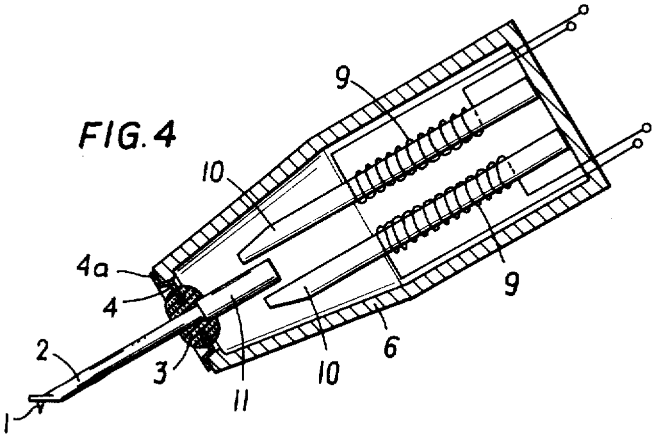
FIG. 4 is a view, similar to FIG. 3, showing the pickup mounting of FIG. 3 in combination with a sound pickup system.

In the embodiment of the invention shown in FIGS. 3 and 4, parts identical to those illustrated in the embodiment of the invention shown in FIGS. 1 and 2 have been designated by the same reference character. Referring to FIG. 3, a diamond 1 is shown engaging or tracking a mechanically modulated groove of a sound-track support, for example, a phonographic disc. Diamond 1 is secured to the outer end of an aluminum tube 2 which is provided, at this end, with an oblique face carrying the diamond. Over the other end of aluminum tube 2, a permanent magnet 11 is fixedly engaged, and is inserted into an opening in elastic body 3 in the same manner as is the aluminum tube 2 of FIG. 3 and the ferromagnetic tube 5 of FIGS. 1 and 2. The details of the pickup mounting or stylus holder shown in FIG. 3 are otherwise exactly the same as the details of the stylus holder shown in FIG. 1.

FIG. 4 shows the design, in principle, of a pickup equipped with the stylus holder of FIG. 3 mounted in accordance with the invention. The pickup comprises a casing 6, which may be of ferromagnetic material, tapering in the direction of the stylus, and four ferromagnetic rods 10 projecting from the closed rear end of casing 6 in a square arrangement. As in the embodiment of the invention shown in FIG. 2, each rod 10 carries a winding 9 in which the flux variations of the magnetic circuit are converted into voltage variations. The magnetic flux passes, from permanent magnet 11 mounted on stylus holder 2, through ferromagnetic casing 6 and rods 10. As already mentioned with respect to the embodiment of the invention shown in FIGS. 1 and 2, the flux can be amplified and, thereby, the sensitivity improved, if, in accordance with the invention, plate 4 is made of a ferromagnetic material. To repeat, in such a case, the gap between the end of casing 6 and the permanent magnet 11 of the stylus holder is minimized so that a flux amplification is obtained and also the flux variations produced by the motion of the stylus holder result in higher induced voltages in windings 9.

Figure 5:
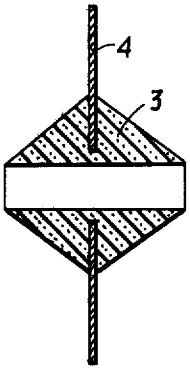
FIGS. 5 through 8 are sectional views illustrating various shapes of symmetrically designed elastic bodies, of rubber or rubber-like material, provided as bearing elements.

In FIGS. 5 to 8, various shapes of the elastic body 3, of rubber or rubber-like material, serving as the bearing element for the stylus holder are shown. In FIG. 5, the body is a double cone in which, in accordance with the invention, plate 4 extends in the plane of the largest diameter. It will be apparent that the opening in plate 4 is larger than the opening in body 3 which latter has to receive the stylus holder.

Figure 6:
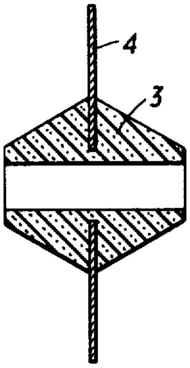
Figure 7:
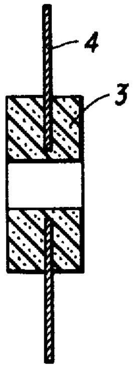
Figure 8:
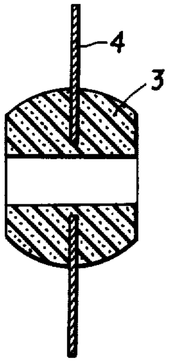

The same applies analogously to the other variants shown in FIGS. 6 to 8 where the bodies extend symmetrically to both sides of plate 4. Of course, other shapes may also be provided for the body 3, depending on what design is considered appropriate in each case.

Figure 9:
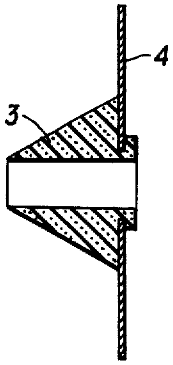
FIG. 9 is a sectional view illustrating one example of an assymetrically shaped bearing body.

The unsymmetrical shape of rubber body 3 relative to plate 4, shown in FIG. 9, will be provided in cases where the co-vibrating rubber or rubber-like material is used for additional balancing of the systems. Even though FIG. 9 shows only a conical elastic body 3, other shapes of bodies of revolution, such as illustrated in FIGS. 5 to 8, may also be provided. In this case again, the designer has to select the most appropriate shape of body 3 among the numerous possibilities. With a suitable selection of the material to be used for the rubber or rubber-like material body serving as the bearing element and of the corresponding shape in accordance with the invention, a mounting of the pickup stylus can be obtained which is outstanding for its resilience, in dependence of the direction in the plane of motion of all its properties, a definite internal friction, very small co-vibrating masses, freedom from hysteresis, and operation independent of frequency.

In addition, the inventive pickup mounting unit is easy to manufacture and can be mounted into the pickup casing in an equally easy manner so that an inexpensive, yet top-quality pickup can be obtained.

A further outstanding feature of the present invention is the provision of an annular suspension, comprising the annular plate 4 and the annular bearing element 3, and by means of which only shearing force restoring torques are exerted on the stylus holder. That is, in the present invention, there is no compression of the annular suspension material 3 by the plate 4, and there is no use of, nor dependence upon, the compression compliance of the annular suspension material for restoring force. Due to the very small spacing between mounting plate 4 and the ferromagnetic tube 5, in the embodiment of FIGS. 1 and 2, and the very small spacing between the mounting plate 4 and the tube 2 and permanent magnet 11 of the embodiment of FIGS. 3 and 4, the very small "restoration force" portion of the annular suspension material, which lies essentially between the two planes defining the opposite surfaces of the thin metal plate 5, is forced into a condition of shearing stress when the stylus or its ferromagnetic portion or armature 5, is displaced from its rest or neutral position. Also, due to the relatively hard nature of the annular suspension material, no compression occurs between the boundaries of the mentioned two planes, and only torsional shear forces form the restoring forces acting upon the complete cantilever assembly including the stylus holder. As the annular suspension material outside the area defined between the planes of the opposite surfaces of the thin metal plate 4 is not forced into compression during armature motion, that is, there is not any form of normalling force applied to the annular suspension material in this area, the material in this area is not subject to compression forces and acts solely as a resistance-controlled damping.

While specific embodiments of the invention have been shown and described in detail to illustrate the application of the principles of the invention, it will be understood that the invention may be embodied otherwise without departing from such principles.

What is claimed is:

1. In a magnetic sound pickup, for tracking mechanically modulated grooves in a record support by means of a tracking stylus, having a magnetic circuit, selected from the type including a fixed permanent magnet and a movable stylus holder having a ferromagnetic part and the type including a permanent magnet movable as a unit with a stylus holder and combined with fixed magnetic circuit elements of ferromagnetic material, and fixed pickup coils associated with the magnetic circuit, and in which the reluctance of the magnetic circuit is varied by displacement of the stylus holder by the tracing stylus mounted therein, the stylus holder being elastically mounted in a bearing element of elastic material, such as rubber and rubber-like material, an improved pickup mounting comprising, in combination, a thin annular magnetically permeable metal plate embedded in said bearing element and extending perpendicular to the longitudinal axis of said stylus holder, said thin metal plate having a central opening therein and a wall thickness which is small relative to the external diameter of said stylus holder; said bearing element having an opening therethrough whose diameter is smaller than that of said central opening in said thin metal plate; said stylus holder extending through the opening in said bearing element with its center of motion being substantially in the plane of said thin metal plate; the diameter of said central opening being only slightly larger than the external diameter of said stylus holder in the portion of said stylus holder passing through said central opening so that said plate and said stylus holder combine to form a portion of the magnetic circuit with only a small gap therebetween, and said stylus holder being connected to said thin metal plate only through said bearing element; said thin metal plate exerting no compression force on said bearing element, and said thin metal plate and said bearing element and their restoring forces acting upon said stylus holder, due to said thin metal plate and said bearing element, being constituted solely by torsional shear forces with the portion of said bearing member extending in opposite directions from the planes defined by the opposite surfaces of said thin metal plate being not forced into compression during motion of said stylus holder and thus being not subjected to compression forces and acting solely as a resistance-controlled damping.

2. An improved pickup mounting, as claimed in claim 1, in which said stylus holder has an intermediate portion, including a ferromagnetic part, engaged in said bearing element, an outer end portion carrying said stylus, and an oscillatable inner end portion, of said ferromagnetic part, projecting a substantial distance inwardly beyond said bearing element, whereby said projecting inner end portion is freely movable responsive to displacement of said stylus holder by said tracking stylus, relative to a magnetic circuit.

3. An improved pickup mounting, as claimed in claim 1, in which said stylus holder has an intermediate portion, including a permanent magnet, engaged in said bearing element, an outer end portion carrying said stylus, and an oscillatable inner end portion, of said permanent magnet, projecting a substantial distance inwardly beyond said bearing element, whereby said projecting inner end portion is freely movable responsive to displacement of said stylus holder by said tracking stylus, relative to a magnetic circuit.

4. An improved pickup mounting, as claimed in claim 1, in which said bearing element is designed as a body of revolution extending to both sides of said plate; said plate being located in the plane of the largest diameter of said bearing element.

5. An improved pickup mounting, as claimed in claim 1, in which said bearing element is designed as a body of revolution and extends axially further from one side of said plate, in the direction of said tracing stylus.

6. An improved pickup mounting, as claimed in claim 2, in which said bearing element is bonded to said ferromagnetic portion of said stylus holder and to said plate to form a unit.

7. An improved pickup mounting, as claimed in claim 1, in which said metal plate has a dish shape with an outwardly projecting rim.

8. An improved pickup mounting, as claimed in claim 1, in which said center of motion of said stylus holder is spaced a preselected distance from the center of mass of said stylus holder.

9. An improved pickup mounting, as claimed in claim 8, in which said stylus holder is homogeneous and rod-shaped, and said center of motion of said stylus holder is spaced, from the center of mass of said stylus holder, at a distance of L/6 where L is the length of said stylus holder.

10. In a magnetic sound pickup, for tracking mechanically modulated grooves in a record support by means of a tracking stylus, of the type having a magnetic circuit, including a permanent magnet and a stylus holder having a ferromagnetic part, and fixed pickup coils associated with the magnetic circuit, and in which the reluctance of the magnetic circuit is varied by displacement of the stylus holder by the tracking stylus mounted therein, the stylus holder being elastically mounted adjacent its center of motion, in a bearing element of elastic material, such as rubber and rubber-like material, an improved pickup mounting comprising, in combination, a metal plate embedded in said bearing element and extending perpendicular to the longitudinal axis of said stylus holder, and having a central opening therein; said stylus holder having a portion passing through said central opening of said plate and the diameter of said central opening being slightly larger than the external diameter of said stylus holder in the portion thereof passing through said central opening of said plate; the thickness of said plate being small relative to such external diameter of said stylus holder; said stylus holder being connected to said plate only through said bearing element; a relatively elongated, slender, tubular sleeve of ferromagnetic material closed at one end and open at the other end, and constituting part of said magnetic circuit; said permanent magnet being engaged with the closed end of said tubular sleeve and having relatively elongated, rod-shaped pole pieces extending toward the open end of said tubular sleeve; said plate being made of ferromagnetic material and being engaged with the open end of said tubular sleeve to also constitute part of said magnetic circuit; said stylus holder having its inner end extending between said rod-shaped pole pieces.

11. In a magnetic sound pickup, for tracking mechanically modulated grooves in a record support by means of a tracking stylus, of the type having a magnetic circuit, including a permanent magnet and a stylus holder having said permanent magnet forming a unit therewith, and fixed pickup coils associated with the magnetic circuit, and in which the reluctance of the magnetic circuit is varied by displacement of the stylus holder by the tracking stylus mounted therein, the stylus holder being elastically mounted adjacent its center of motion, in a bearing element of elastic material, such as rubber and rubber-like material, an improved pickup mounting comprising, in combination, a metal plate embedded in said bearing element and extending perpendicular to the longitudinal axis of said stylus holder, and having a central opening therein; said stylus holder having a portion passing through said central opening of said plate and the diameter of said central opening being slightly larger than the external diameter of said stylus holder in the portion thereof passing through said central opening of said plate; the thickness of said plate being small relative to such external diameter of said stylus holder; said stylus holder being connected to said plate only through said bearing element; a relatively elongated, slender, tubular sleeve of ferromagnetic material closed at one end and open at the other end, and constituting part of said magnetic circuit; and relatively elongated, rod-shaped pole pieces extending from the closed end toward the open end of said tubular sleeve; said plate being made of ferromagnetic material and being engaged with the open end of said tubular sleeve to also constitute part of said magnetic circuit; said stylus holder having its inner end extending between said rod-shaped pole pieces.

* * * * *